United States Patent

[11] 3,634,840

[72] Inventor Bruce L. Wilkinson
    Torrance, Calif.
[21] Appl. No. 886,590
[22] Filed Dec. 19, 1969
[45] Patented Jan. 11, 1972
[73] Assignee The United States of America as represented by the Secretary of the Army

[54] HIGH-TEMPERATURE WARNING SYSTEM
    2 Claims, 4 Drawing Figs.
[52] U.S. Cl............................................... 340/228 R,
    338/25, 340/227 R, 340/331
[51] Int. Cl. ............................................... G08b 17/06
[50] Field of Search ............................................ 340/228 R;
    338/25

[56] References Cited
    UNITED STATES PATENTS
2,106,249 1/1938 Hower........................... 338/25
2,274,830 3/1942 Gould et al. .................... 338/25
3,418,648 12/1968 Futaki............................ 340/228
3,475,745 10/1969 White............................. 340/228 X Primary Examiner—David L. Trafton
Attorneys—Harry M. Saragovitz, Edward J. Kelly, Herbert Berl and Arthur L. Girard ABSTRACT: The present invention provides a novel temperature warning device comprising only a tungsten filament lamp, a thermistor sensor device and a voltage source all in series circuit relation, which system when properly designed (i.e., the thermal time constant of the lamp exceeds that of the sensor) provides a visible signal which is a function of the temperature of the sensor's housing.

The present invention relates generally to temperature sensor and warning systems and more particularly to systems for determining when the temperature of an environment has exceeded a specified predetermined maximum.

PATENTED JAN 11 1972

3,634,840

——————— $R_L = 1 R_K$
— — — — — $R_L = 1.5 R_K$
— · — · — $R_L = 2 R_K$ $R_K$ = ARBITRARY VALUE OF LAMP RESISTANCE

INVENTOR
BRUCE L. WILKINSON

BY Harry M. Saragovitz
Edward J. Kelly
Herbert Berl and
Arthur L. Girard
ATTORNEYS

HIGH-TEMPERATURE WARNING SYSTEM

SUMMARY OF THE INVENTION

A series circuit consisting only of a tungsten filament lamp, and a thermistor temperature sensor when made up of properly designed elements provides a visible signal which is a function of the temperature of the thermistor sensor's housing. When the housing temperature is above a predetermined alarm temperature the lamp glows alternately bright and dim at a rate of, for example, 10 cycles per minute. In the event of a failure of some portion of the circuit, the lamp glows either steady bright or completely dark, depending upon the type of failure which occurs.

DESCRIPTION OF THE DRAWINGS

Figure 1:
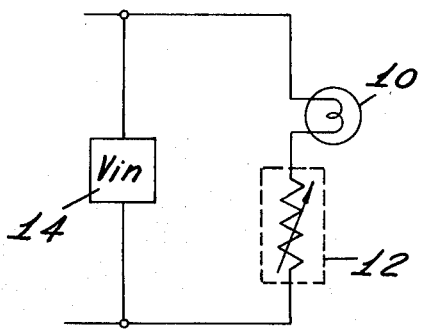
FIG. 1 shows a schematic diagram of the thermistor, tungsten lamp sensor circuit of the present invention.
Figure 2:
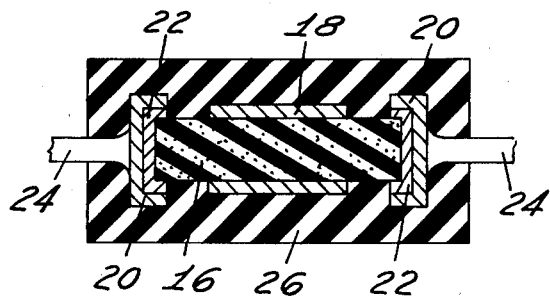
FIG. 2 shows one embodiment of a thermistor suitable for use in the circuit of FIG. 1.
Figure 3:
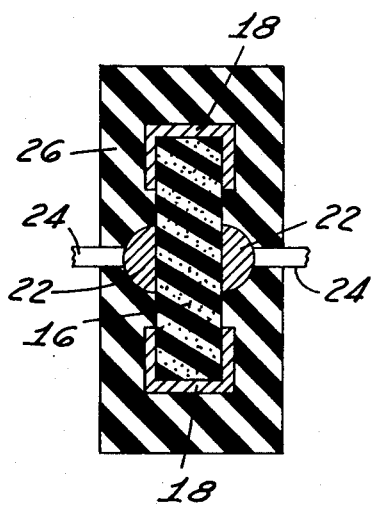
FIG. 3 shows an alternate preferred embodiment of a thermistor suitable for use in the circuit of FIG. 1.
Figure 4:
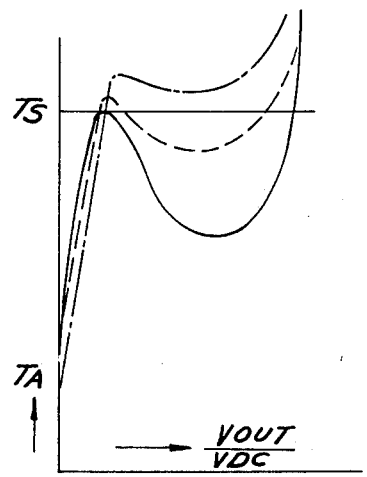
FIG. 4 is a graphic representation of the theory of operation of the thermal switch of FIG. 1.

FIG. 1 shows a schematic diagram of the thermistor, tungsten lamp sensor circuit of the present invention;

FIG. 2 shows one embodiment of a thermistor suitable for use in the circuit of FIG. 1;

FIG. 3 shows an alternate preferred embodiment of a thermistor suitable for use in the circuit of FIG. 1; and FIG. 4 is a graphic representation of the theory of operation of the thermal switch of FIG. 1.

DETAIL DESCRIPTION OF THE INVENTION

Thermistors have a condition called thermal runaway which occurs due to the self-dissipation of such devices. In a typical thermistor there are two extremes of thermal environment in which the thermistor can be considered. These two are an adiabatic system and an isothermal system. In an isothermal system, the resistance of the thermistor is dependent only on the temperature of the total isothermal system. In an adiabatic system however, the temperature of the thermistor will, if any current is flowing through it, climb until the device either destroys itself or reaches a condition of zero ohms, i.e., no further dissipation is produced. The theory of the instant temperature warning circuit utilizes a combination of these two extremes.

By controlling the thermal conductivity of the container in which the thermistor is mounted by utilizing a thermal resistance coating of an insulating material, and immersing this container in a fluid whose temperature one wishes to sense (thus the thermistor device becomes the sensing element in the system), the thermistor is made to switch (in a controlled thermal runaway) at a specific temperature.

If the above described thermistor is placed in a circuit with a device external to the sensing element which has a resistance change characteristic which is opposite of that of the thermistor (a thermistor's resistance decreases with increasing temperature, therefore, the external device must have resistance increase with increasing temperature) then another phenomenon occurs. The external device, after the thermistor switches, i.e., undergoes controlled thermal runaway, decreases the power dissipation in the thermistor by heating and increasing its resistance thereby switching the thermistor back to its initial condition. Refractory materials such as tungsten, provide this second external device characteristic. Therefore, by the proper design of a thermistor and a tungsten filament lamp, one can make a device which will cycle between the two states when the thermistor-mounting fixture is at or above a specific temperature.

In order to provide cyclic operation one additional important condition must be met. That condition is that the thermal time constant (i.e., the period of time required for the lamp to heat up to the switching temperature or cool down and therefore become lower in resistance to the point where the thermistor can undergo "runaway" once again) of the lamp must be longer than the thermal time constant of the thermistor (i.e., the period of time required for the thermistor to reach a condition of zero ohms or self-destruction) to preclude the possibility of the system coming to rest at an equilibrium point halfway through the switching operation.

On a servo or closed loop basis, the operational characteristics of the thermistor can be considered as positive feedback and the lamp as negative feedback. The basic circuit as shown in FIG. 1 is a series connection of a suitable tungsten lamp and thermistor driven by a voltage source. Thus, as shown in FIG. 1 the thermal sensing system of the present invention comprises, in series circuit relation, a tungsten filament lamp 10 and a thermistor 12 driven by an input voltage from power source 14.

As already described the lamp for this system must have a long thermal time constant. Such a constant is provided by making the filament of the lamp much more massive than that in a conventional lamp design. This is accomplished by using a longer length of heavier wire and closely coiling it to approach the same cold and hot resistance as a normal lamp. In this configuration the thermal mass of the filament is much higher than a normal lamp and it takes a much longer time to heat or cool the filament.

When properly designed as described below the system can be made to provide an indication of proper system functioning by having the tungsten lamp glow dimly at temperatures below the switching temperature (in a "safe" temperature condition). At extremely low, decreasing, temperatures, i.e., below about 32° F., the thermistor resistance is rising rapidly, and could cause the lamp to become invisible. This phenomenon, although not necessarily detrimental to the successful use of this system, can be prevented by depositing a resistance film of, for example, nichrome over the body of the thermistor, which limits the maximum resistance to a value sufficient to keep the lamp filament of 1,000° F., a temperature at which the filament provides a dull red glow similar to that experienced in the filament of vacuum tubes; such a coating will be described below. In the overtemperature or "switched" condition, the lamp temperature, i.e., the filament temperature, approaches about 3,200° F. The resistance change in the lamp under these conditions is approximately 2.5 to 1. Under these conditions the system then functions in the following manner:

a. normal operation, safe temperature, lamp panel glows dimly;

b. normal operation, overtemperature, flashing of lamp approximately 10 times per minute depending upon the particular filament and thermistor used;

c. faulty system, open circuit, lamp panel dark;

d. faulty system, due to short circuit of sensor, steady bright light.

The theory of operation of the thermal switch is derived from the graph shown in FIG. 4 and the equation set forth below.

$$T_A = \frac{BT_o}{B + T_o l_n \frac{R_L}{R_o} \frac{VDC}{V\text{ out}} \left(1 - \frac{V\text{ out}}{VDC}\right)} - K \frac{VDC^2}{R_L} \frac{V\text{ out}}{VDC} \left(1 - \frac{V\text{ out}}{VDC}\right)$$

Wherein:
$T_A$—Ambient temperature of sensor
$T_o$—Reference temperature (25° C.)
$B$—A constant characteristic of the thermistor
$R_o$—Resistance of thermistor at $T_o$
$R_L$—Resistance of lamp
VDC—Input voltage
Vout—Voltage across $R_L$ K—A constant defining thermal resistance The first term of the equation delineates the behavior of the thermistor in an isothermal environment. The second term delineates the effects of self-heating due to internal dissipation and thermal resistance. It should be observed that in this equation input voltage is expressed as a ratio of input to output and drops out as a factor in the equation. As should be clear from a study thereof the equation can be multivalued, i.e., having three solutions when the second term is of sufficient magnitude. The plot of this curve is shown in FIG. 4, plotted for three values of $R_L$, $R_L=1$ unit, $R_L=1.5$ units, and $R_L=2$ units. At a specific ambient temperature, the lamp has a resistance $R_K$. If the ambient temperature reaches the switching temperature $T_S$, the thermistor will drop its resistance due to thermal self-heating, and will abruptly raise the voltage across $R_L$. This higher voltage will cause the lamp to brighten markedly, and the lamp filament will heat and increase its resistance. This moves the characteristic curve through an infinite family of curves until the thermistor cannot draw sufficient power for self-heating (the function becomes single valued) and the lamp power decreases, lowering the resistance until the initial conditions are reestablished and the entire process repeats.

This results in the blinking of the lamp in an overtemperature condition. If the temperature of the ambient decreases slightly below the trigger point, the lamp will stop flashing, since it cannot climb over the peak point of the curve to switch on.

A thermistor of the type suitable for use in the present invention is shown in FIG. 2. This comprises bulk thermistor 16 coated on opposing sides thereof with a conductive resistance film 18, the thermistor having copper end caps 20 connected to opposing ends thereof by hard solder layer 22, the end caps being jointed to the circuit by conducting wires 24, the entire thermistor sensor structure being in a thermal resistance coating of an electrical insulator 26. A similar thermistor switch assembly of the disc type is shown in FIG. 3 wherein the similar numbers indicate similar portions of the thermistor assembly structure.

Standard metal oxide thermistors and separate fixed commercial resistors can be utilized to achieve the above-described results and to construct the device described herein.

A high-temperature warning system of the type disclosed herein can be designed for any of a number of applications, the particular design thereof, i.e., the switching temperature, being determined by the particular thermistor material utilized. Such systems can be used in refrigerated areas wherein a rise of temperature above a predetermined level would cause damage to the refrigerated goods, in mechanical applications wherein overheating of either a liquid such as automotive oil or coolant or alternatively a specific area, i.e., within the brake assembly, could be reported to the operator of the vehicle or equipment within which the sensor is mounted. As should be clear to one skilled in this art, the application of the circuit and system described herein are almost endless and are limited only by the imagination of the user.

Although the invention has been described in detail with particular reference to particular embodiments thereof, it should be understood that alterations and modifications thereof may be made within the spirit and scope of the invention.

I claim:

1. A thermal warning system comprising a tungsten filament lamp, a sensor thermistor device, and a direct current voltage source connected with said lamp and said device in series circuit relationship, wherein:

said lamp filament is of such a thermal mass relative to said device that its thermal time constant is longer than that of the thermistor device;

the thermistor device comprises a body having a negative thermal coefficient of resistance, a pair of conductive wires, said wires terminating at opposite faces of said body, a hard solder connection forming a bond between the terminal end of a said wire and its adjacent body face, there being one such connection for each said wire terminal, and a conductive resistance film on said body between said connections at each of two opposite faces of the body;

the thermal masses of the lamp and the thermistor device being such that, as thermistor resistance decreases with increasing temperature, the lamp filament heats and increases in resistance thereby reducing power dissipation in the thermistor device and eventually switching the thermistor device back to its initial condition in which the resistance of the thermistor device again decreases as its temperature increases, thereby providing cyclic heating and cooling and consequent alternately bright and dull glowing of the lamp filament to indicate when the thermistor device is at or above a specified temperature.

2. A warning system as in claim 1, wherein the terminal ends of said wires are provided with copper end caps in engagement thermally and electrically with their respective hard solder connections.

* * * * *